(12) United States Patent
Christdhas

(10) Patent No.: US 8,873,190 B1  
(45) Date of Patent: Oct. 28, 2014

(54) DISK DRIVE GENERATING FLY HEIGHT MEASUREMENT FROM SERVO BURST AND ADJUSTING BY POSITION ERROR SIGNAL

(75) Inventor: Suthananth E. Christdhas, Singapore (SG)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/593,374

(22) Filed: Aug. 23, 2012

(51) Int. Cl.
*G11B 21/02* (2006.01)

(52) U.S. Cl.
USPC .............................................. 360/75; 360/234

(58) Field of Classification Search
USPC .......... 360/55, 71, 78.12, 75, 230, 234, 234.3
See application file for complete search history.

(56) References Cited

U.S. PATENT DOCUMENTS

| | | | |
|---|---|---|---|
| 6,097,559 A * | 8/2000 | Ottesen et al. ................... | 360/31 |
| 7,253,984 B1 * | 8/2007 | Patapoutian et al. ........... | 360/75 |
| 7,706,095 B2 * | 4/2010 | Boutaghou et al. ............. | 360/75 |
| 7,729,079 B1 * | 6/2010 | Huber .............................. | 360/75 |
| 8,077,414 B2 * | 12/2011 | Rochat et al. ................... | 360/25 |
| 8,077,427 B2 * | 12/2011 | Mathew et al. ................. | 360/75 |
| 8,154,820 B1 | 4/2012 | Madden et al. | |
| 2002/0030920 A1 * | 3/2002 | Min et al. ................... | 360/77.04 |
| 2003/0026018 A1 * | 2/2003 | Forehand ........................ | 360/31 |
| 2006/0044658 A1 * | 3/2006 | Ma ................................... | 360/31 |
| 2006/0082917 A1 * | 4/2006 | Yao et al. ........................ | 360/75 |
| 2007/0230019 A1 * | 10/2007 | Song et al. ...................... | 360/75 |
| 2008/0013198 A1 * | 1/2008 | Ma ................................... | 360/31 |
| 2011/0013305 A1 * | 1/2011 | Ehrlich et al. .................. | 360/31 |
| 2011/0043938 A1 * | 2/2011 | Mathew et al. ................. | 360/31 |
| 2011/0317302 A1 * | 12/2011 | Sakai et al. ..................... | 360/31 |

\* cited by examiner

*Primary Examiner* — Thomas Alunkal

(57) ABSTRACT

A disk drive is disclosed comprising a head actuated over a disk comprising a plurality of servo tracks defined by servo sectors, wherein each servo sector comprises a plurality of servo bursts. The servo bursts in a servo sector are read to generate a read signal, and a position error signal (PES) is generated in response to the read signal, wherein the PES represents a position of the head over the disk. A fly height measurement (FHM) is generated in response to the read signal, and the FHM is adjusted based on an adjustment value generated in response to the PES.

12 Claims, 3 Drawing Sheets

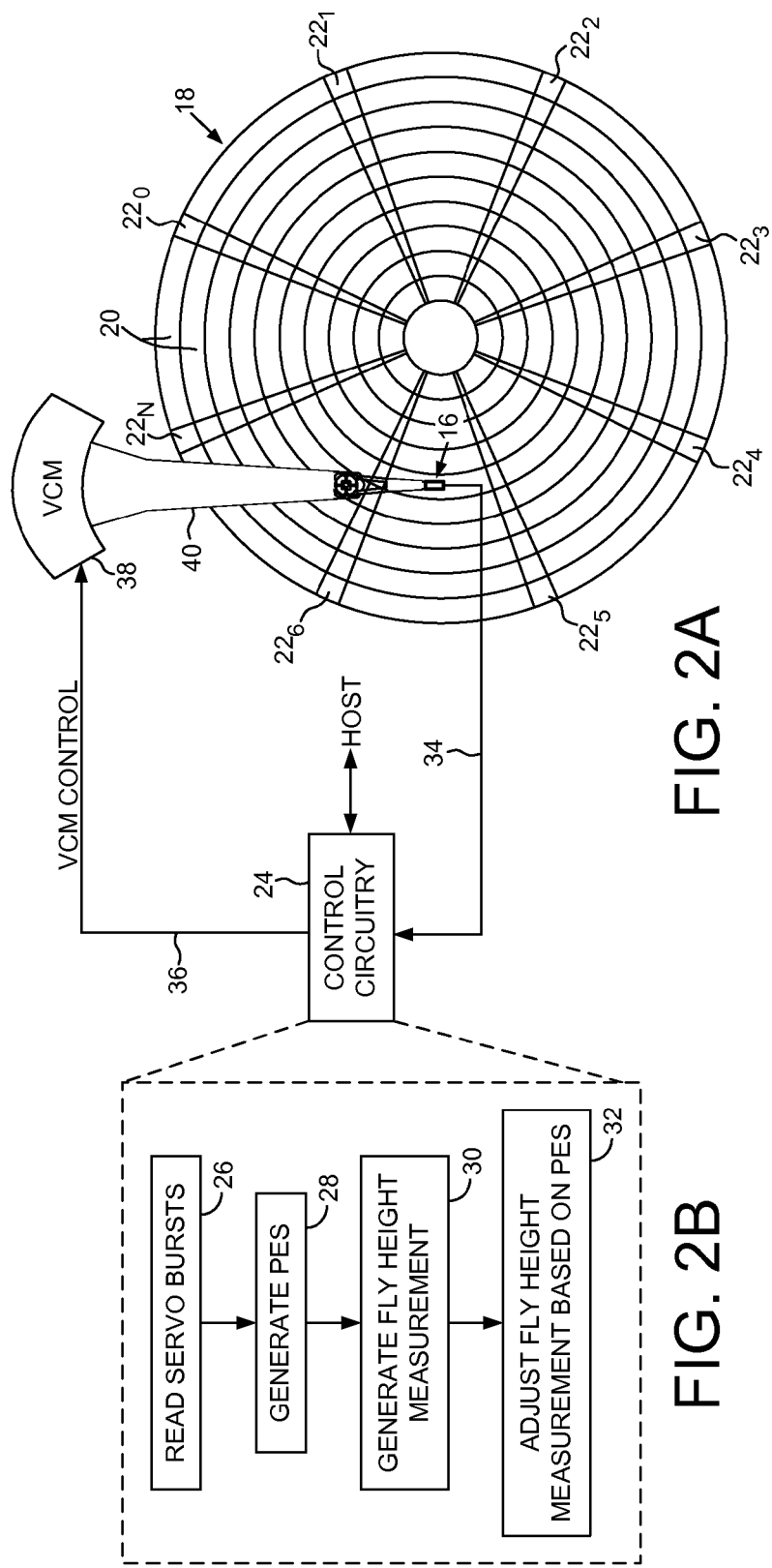

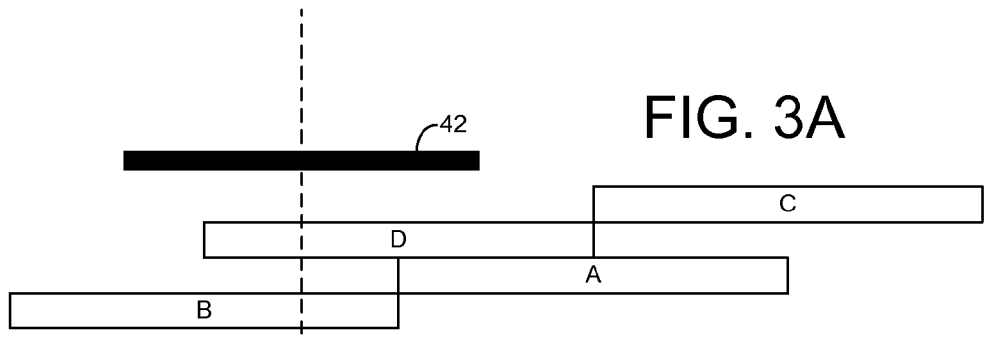
FIG. 3A
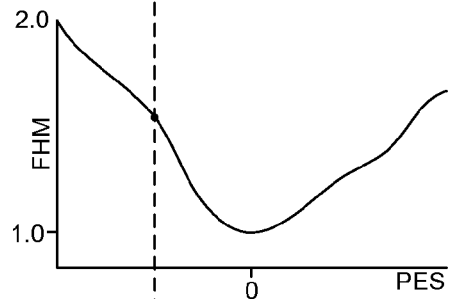
FIG. 3B
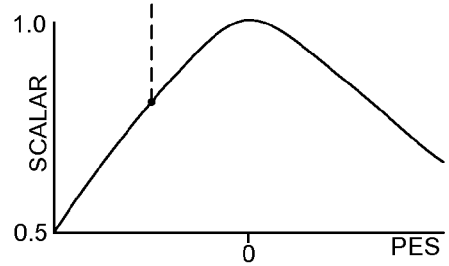
FIG. 3C
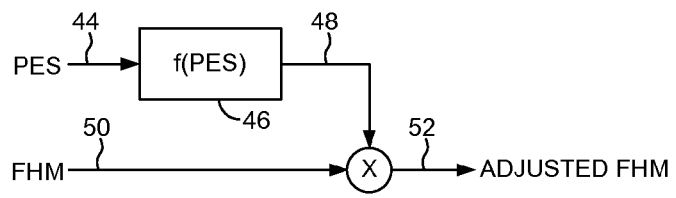
FIG. 3D
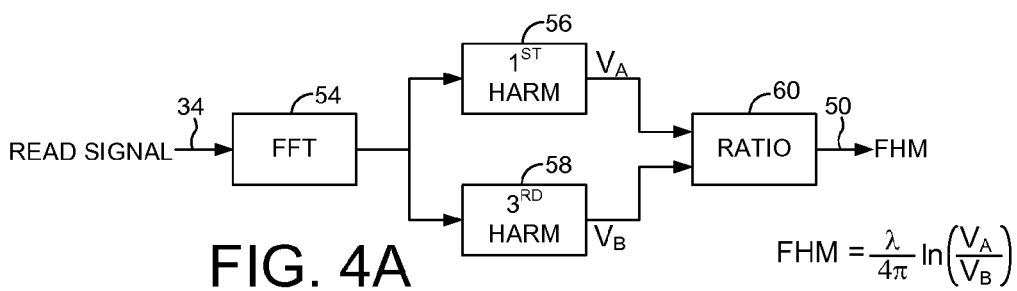
FIG. 4A
$$FHM = \frac{\lambda}{4\pi} \ln\left(\frac{V_A}{V_B}\right)$$
FIG. 4B

DISK DRIVE GENERATING FLY HEIGHT MEASUREMENT FROM SERVO BURST AND ADJUSTING BY POSITION ERROR SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

FIG. 1 shows a prior art disk format 2 comprising a number of servo tracks 4 defined by servo sectors $6_0$-$6_N$ recorded around the circumference of each servo track, wherein data tracks are defined relative to the servo tracks. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D servo bursts), which comprise a number of consecutive transitions recorded at precise intervals and offsets with respect to a servo track centerline. The groups of servo bursts 14 provide fine head position information used for centerline tracking while accessing a data track during write/read operations.

Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height. For example, the DFH servo controller may measure the fly height of the head by reading a reference pattern from the disk and calculating a ratio of the read signal amplitude at predetermined harmonics.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a PES is generated by reading servo bursts in a servo sector, a fly height measurement (FHM) is generated, and the FHM is adjusted based on the PES.

FIGS. 3A-3D illustrate generating an adjustment value (scalar) for adjusting the FHM as a function of the PES according to an embodiment of the present invention.

FIGS. 4A and 4B show an embodiment of the present invention wherein the FHM is generated as a ratio of a first and third harmonic of the read signal while reading a servo burst.

DETAILED DESCRIPTION OF EMBODIMENTS OF THE INVENTION

Figure 1:
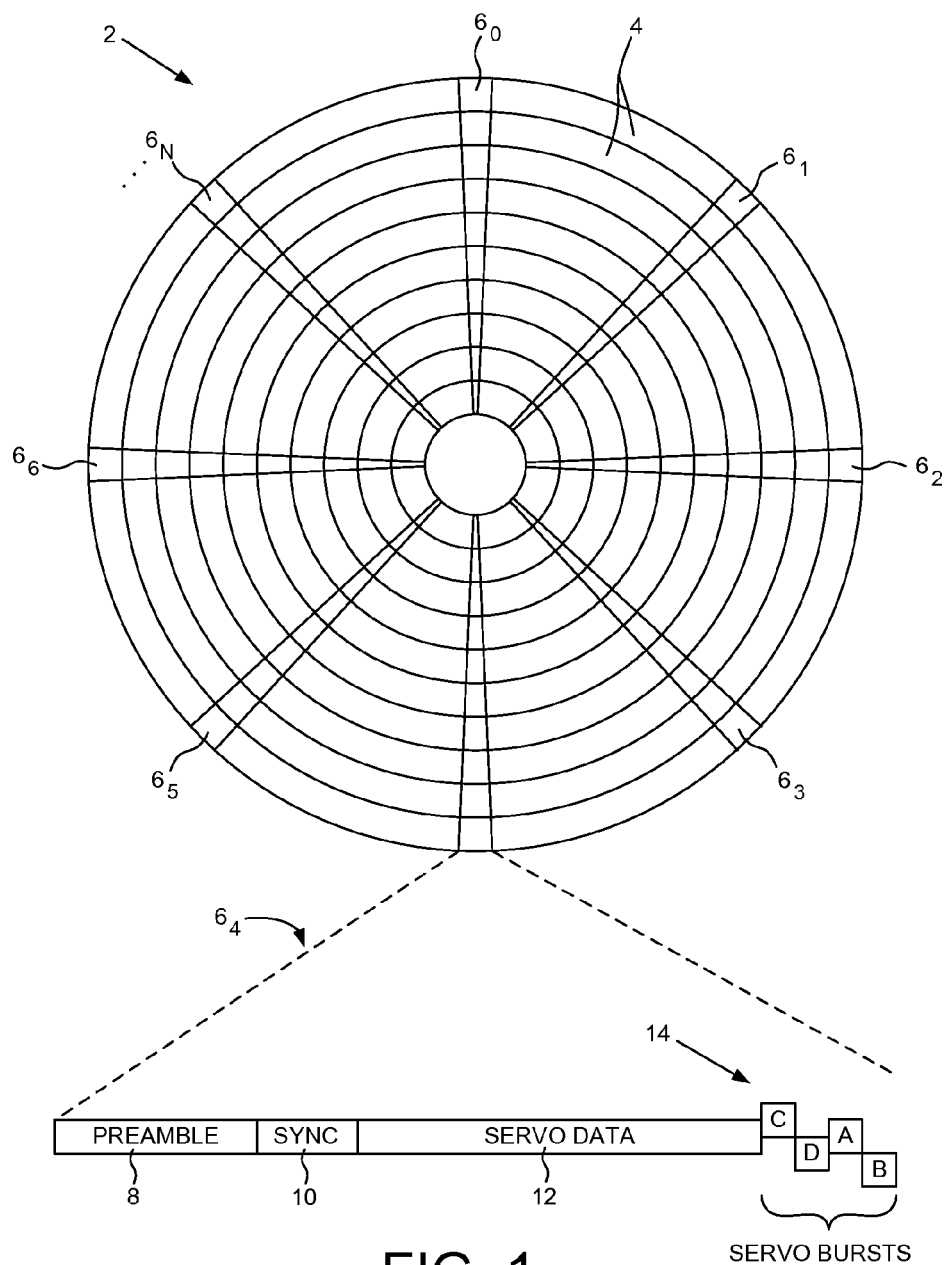
FIG. 1 shows a prior art disk format comprising a plurality of servo tracks defined by servo sectors.

FIG. 2A shows a disk drive according to an embodiment of the present invention comprising a head 16 actuated over a disk 18 comprising a plurality of servo tracks 20 defined by servo sectors $22_0$-$22_N$, wherein each servo sector comprises a plurality of servo bursts. The disk drive further comprises control circuitry 24 operable to execute the flow diagram of FIG. 2B, wherein the servo bursts in a servo sector are read to generate a read signal (block 26). A position error signal (PES) is generated in response to the read signal (block 28), wherein the PES represents a position of the head over the disk. A fly height measurement (FHM) is generated in response to the read signal (block 30), and the FHM is adjusted based on an adjustment value generated in response to the PES (block 32).

In the embodiment of FIG. 2A, the control circuitry 24 processes the read signal 34 emanating from the head 16 to demodulate the servo sectors and generate the position error signal (PES) representing an error between the actual position of the head and a target position relative to a target track. The control circuitry 24 filters the PES using a suitable compensation filter to generate a control signal 36 applied to a voice coil motor (VCM) 38 which rotates an actuator arm 40 about a pivot in order to actuate the head 16 radially over the disk 18 in a direction that reduces the PES. The servo sectors may comprise any suitable head position information, such as a track address for coarse positioning and servo bursts for fine positioning.

In one embodiment, the servo bursts in the servo sectors comprise an amplitude based servo pattern, such as the servo pattern shown in FIG. 1 and in FIG. 3A. Each servo burst in FIG. 3A comprises a number of magnetic transitions recorded at a predetermined frequency. An amplitude may be measured for each servo bursts (e.g., by integrating the read signal), and the PES generated based on the measured amplitudes using any well known relationship.

In the embodiments of the present invention, the FHM is also generated in response to the read signal while reading at least one of the servo bursts. In the example shown in FIG. 3A, the FHM may be generated in response to the read signal while reading the D servo burst. FIG. 3A shows a read element 42 of the head 16 relative to the servo bursts, and FIG. 3B shows the resulting PES as the read element 42 moves radially across the disk 18. When the read element 42 is centered over the D servo burst (and centered about the A/B servo burst boundary), the PES is zero and the signal strength of the read signal generated while reading the D servo burst is maximum. As the read element 42 moves radially across the disk 18 away from the center of A/B servo burst boundary, the radial offset will be reflected in the non-zero PES. In addition, the signal strength of the read signal while reading the D servo burst will decrease due to the read element 42 spanning only part of the D servo burst as illustrated in FIG. 3A. As the signal strength of the read signal decreases due to the offset of the read element 42, the FHM will indicate a higher fly height as illustrated in FIG. 3B. That is, the read element 42 deviating radially away from the center of the D servo burst will change the FHM similar to a reduction in the signal strength caused by the fly height of the read element 42 increasing. Therefore, the radial offset of the read element 42 will induce an error in the FHM that is compensated by the embodiments of the present invention.

FIG. 3B shows an example of the FHM error caused by the radial offset of the read element 42 as reflected in the PES. The FHM in FIG. 3B has been normalized to 1.0 when the read element 42 is centered over the D servo burst (no FHM error), with an increase in the FHM as the magnitude of the PES increases as the read element 42 deviates from the center of the D servo burst. In one embodiment in order to compensate for the FHM error, the FHM is adjusted by a scalar computed as a function of the PES. FIG. 3C shows an embodiment of the present invention wherein a scalar is generated as a function of the PES so that when multiplied by the FHM shown in FIG. 3B, the FHM error in FIG. 3B is canceled (i.e., the resulting FHM will be 1.0).

FIG. 3D illustrates the above described embodiment wherein the PES 44 generated by reading the servo bursts is input into a function 46 that outputs a corresponding scalar 48 (such as shown in FIG. 3C). The FHM 50 generated from reading the servo bursts is multiplied by the scalar 48 to generate the adjusted FHM 52 that compensates for the FHM error due to the radial offset of the read element 42.

The function 46 for generating the scalar 48 based on the PES 44 may be generate in any suitable manner. In one embodiment, a relationship of the FHM error and the PES (such as shown in FIG. 3B) is measured by first calibrating the FHM using any suitable technique, such as decreasing the fly height until a touchdown is detected. Once the FHM is calibrated, the FHM error relative to the PES is measured by scanning the head over a servo track while generating a FHM for a plurality of different PES values (such as shown in FIG. 3B). In one embodiment, the head may be scanned over the servo track multiple times and the resulting FHM/PES measurements averaged in order to average out noise. An adjustment value (e.g., scalar) is then generated based on the FHM/PES measurements that will compensate for the FHM error (such as shown in FIG. 3C). In one embodiment, the calibration procedure is executed at multiple radial locations to account for the changing width of the read element 42 relative to the width of a servo track due to the changing skew angle of the head 16.

The adjustment value for adjusting the FHM based on the PES may be generated in any suitable manner. In one embodiment, the FHM adjustment value may be generated using a lookup table indexed by the PES. In another embodiment, a suitable curve fitting algorithm may be employed to generate a function that estimates the FHM/PES relationship based on the FHM/PES measurements. For example, in one embodiment the function for generating the FHM adjustment may be implemented by estimating coefficients of a polynomial that best fits the FHM/PES measurements. During normal operation, the PES 44 measured by reading the servo bursts is input into the function 46 in order to generate the FHM adjustment value 48 as shown in FIG. 3D. In one embodiment, coefficients for multiple polynomials may be generated each corresponding to a different calibrated radial location, wherein the FHM adjustment values 48 for the intermediate radial locations may be generated using interpolation.

Any suitable algorithm may be employed in the embodiments of the present invention to generate the FHM. FIGS. 4A and 4B show an embodiment of the present invention wherein a harmonic ratio algorithm is used to generate the FHM 50 while reading a servo burst by measuring the amplitude of the read signal 34 at target frequencies using a Fast Fourier Transform (FFT) 54. The amplitude of the read signal 34 at a first harmonic ($V_A$) 56 and at a second harmonic ($V_B$) 58 is measured. A log of the ratio ($V_A/V_B$) 60 is then multiplied by $\lambda/4\pi$ as shown in FIG. 4B, where $\lambda$ is the frequency of the read signal in the spatial domain (i.e., velocity/write_frequency). In one embodiment, the first harmonic ($V_A$) 56 is the fundamental harmonic of the read signal 34, and the second harmonic ($V_B$) 58 is the third harmonic of the read signal 34.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by servo sectors, wherein each servo sector comprises a plurality of servo bursts;
   a head actuated over the disk; and
   control circuitry operable to:
      read the servo bursts in a servo sector to generate a read signal;
      generate a position error signal (PES) in response to the read signal, wherein the PES represents a position of the head over the disk;
      generate a first fly height measurement (FHM) in response to the read signal; and
      adjust the first FHM based on an adjustment value generated in response to the PES.

2. The disk drive as recited in claim 1, wherein the control circuitry is further operable to calibrate the adjustment value by scanning the head over a servo track while generating a FHM for a plurality of different PES values.

3. The disk drive as recited in claim 1, wherein the control circuitry is further operable to generate the adjustment value as a function of the PES.

4. The disk drive as recited in claim 3, wherein the adjustment value comprises a scalar computed as a function of the PES.

5. The disk drive as recited in claim 4, wherein the control circuitry is further operable to multiply the first FHM by the scalar.

6. The disk drive as recited in claim 1, wherein the control circuitry is further operable to:
- measure a first harmonic and a second harmonic of the read signal; and
- generate the first FHM based on a ratio of the first and second harmonics.

7. A method of operating a disk drive, the disk drive comprising a head actuated over a disk comprising a plurality of servo tracks defined by servo sectors, wherein each servo sector comprises a plurality of servo bursts, the method comprising:
- reading the servo bursts in a servo sector to generate a read signal;
- generating a position error signal (PES) in response to the read signal, wherein the PES represents a position of the head over the disk;
- generating a first fly height measurement (FHM) in response to the read signal; and
- adjusting the first FHM based on an adjustment value generated in response to the PES.

8. The method as recited in claim 7, further comprising calibrating the adjustment value by scanning the head over a servo track while generating a FHM for a plurality of different PES values.

9. The method as recited in claim 7, further comprising generating the adjustment value as a function of the PES.

10. The method as recited in claim 9, wherein the adjustment value comprises a scalar computed as a function of the PES.

11. The method as recited in claim 10, further comprising multiplying the first FHM by the scalar.

12. The method as recited in claim 7, further comprising:
- measuring a first harmonic and a second harmonic of the read signal; and
- generating the first FHM based on a ratio of the first and second harmonics.

* * * * *